United States Patent
Gaither

(10) Patent No.: US 11,588,198 B2
(45) Date of Patent: Feb. 21, 2023

(54) PIVOTING BUS BAR MODULE TERMINAL ASSEMBLY

(71) Applicant: Toyota Motor Engineering & Manufacturing North America, Inc., Plano, TX (US)

(72) Inventor: Geoffrey D. Gaither, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 265 days.

(21) Appl. No.: 16/775,830

(22) Filed: Jan. 29, 2020

(65) Prior Publication Data

US 2021/0234141 A1 Jul. 29, 2021

(51) Int. Cl.

| | |
|---|---|
| H01M 10/00 | (2006.01) |
| H01M 50/20 | (2021.01) |
| H01M 10/42 | (2006.01) |
| H01M 50/502 | (2021.01) |
| H01M 50/543 | (2021.01) |

(52) U.S. Cl.
CPC ....... *H01M 50/20* (2021.01); *H01M 10/4257* (2013.01); *H01M 50/502* (2021.01); *H01M 50/543* (2021.01); *H01M 2220/20* (2013.01)

(58) Field of Classification Search
CPC ............. H01M 50/20; H01M 10/4257; H01M 50/502; H01M 50/543; H01M 2220/20; H01M 10/052; H01M 50/271; H01M 50/507; H01M 50/209; Y02E 60/10
See application file for complete search history.

(56) References Cited

U.S. PATENT DOCUMENTS

| | | | |
|---|---|---|---|
| 10,249,966 B2 | 4/2019 | Yaita | |
| 2010/0114762 A1* | 5/2010 | Ishii | B60R 16/04 705/40 |

(Continued)

FOREIGN PATENT DOCUMENTS

| | | |
|---|---|---|
| CN | 109964340 A | 7/2019 |
| CN | 110024177 A | 7/2019 |

(Continued)

OTHER PUBLICATIONS

"Battery distribution & fuse box", Accessed: Sep. 20, 2019; URL: https://www.12voltplanet.co.uk/battery-distribution-fuse-box.html.

*Primary Examiner* — Nicholas P D'Aniello
(74) *Attorney, Agent, or Firm* — Dinsmore & Shohl LLP

(57) ABSTRACT

Embodiments described herein generally relate to a battery pack assembly. The battery pack assembly includes a housing and a plurality of battery cells. The housing includes a pair of sidewalls and a pair of end walls that define a cavity, and a pair of lids. Each lid of the pair of lids has an interior surface and each lid of the pair of lids moves between an open position and a closed position. A plurality of terminal connectors are positioned on each inner surface of each of the pair of lids. The plurality of battery cells are positioned within the cavity. Each battery cell of the plurality of battery cells has a pair of terminals. When each lid is in the closed position, each of the plurality of terminal connectors are communicatively coupled to a corresponding terminal of the pair of terminals of each battery cell.

20 Claims, 6 Drawing Sheets

(56) References Cited

U.S. PATENT DOCUMENTS

| | | | |
|---|---|---|---|
| 2015/0024239 A1* | 1/2015 | Haug | H01M 50/569 429/7 |
| 2015/0072209 A1 | 3/2015 | Tyler et al. | |
| 2017/0256826 A1 | 9/2017 | Hong et al. | |
| 2019/0198847 A1* | 6/2019 | Shimizu | H01M 50/298 |

FOREIGN PATENT DOCUMENTS

| JP | 2017216200 A | 12/2017 |
|---|---|---|
| JP | 2017216802 A | 12/2017 |

\* cited by examiner

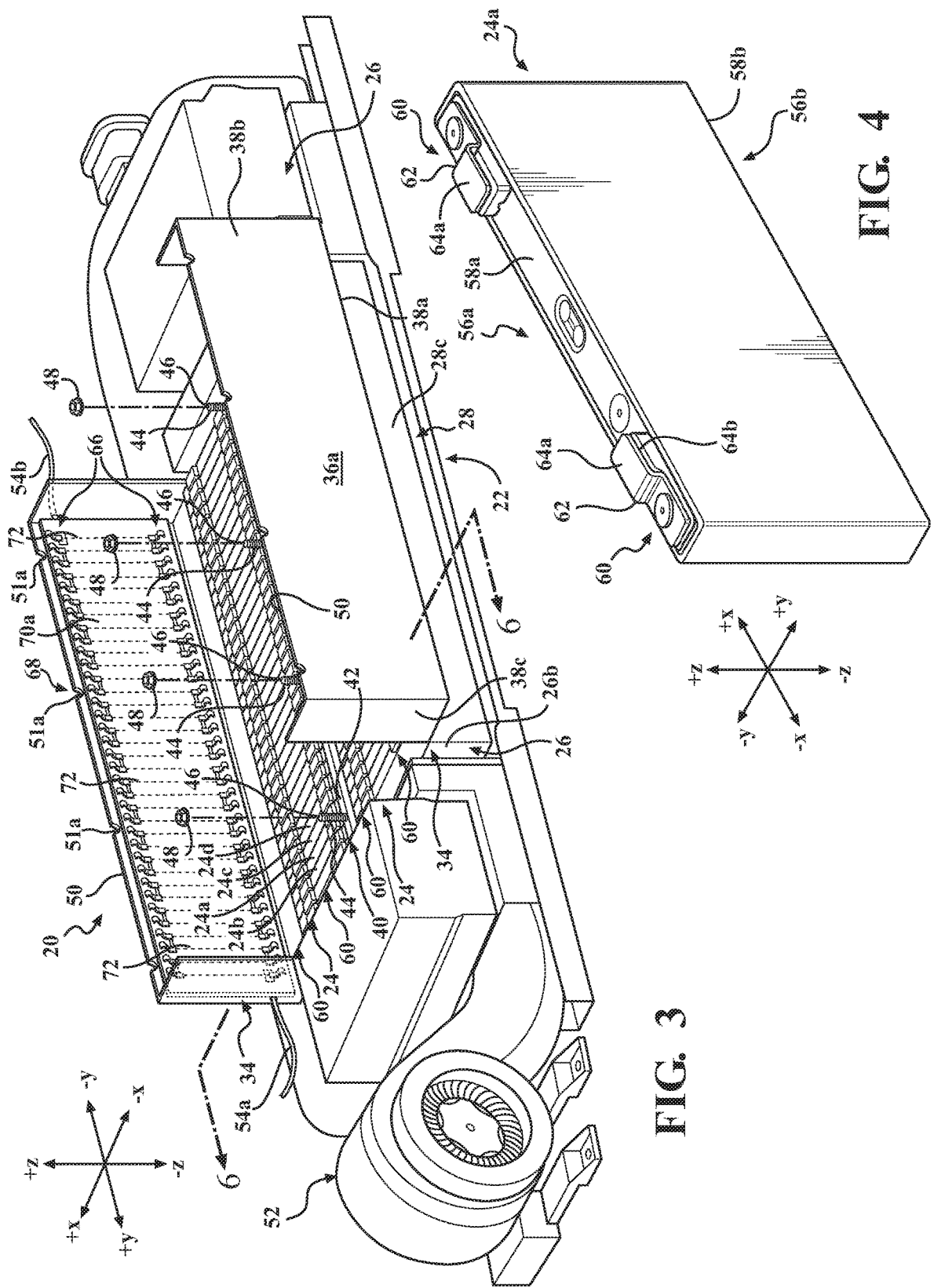

PIVOTING BUS BAR MODULE TERMINAL ASSEMBLY

TECHNICAL FIELD

The present specification generally relates to a vehicle battery pack and, more specifically, to the vehicle battery packs and removal features thereof.

BACKGROUND

Hybrid electric vehicles include battery packs that further include a stack of battery cells and a bus bar module provided on top of the stack of battery cells. The bus bar module is generally configured to carry a voltage and current to a component of the vehicle (e.g., a powertrain component of the vehicle). Each of the plurality of cells includes a pair of externally threaded terminals. The bus bar module includes a plurality of housings that each include a terminal plate for connecting to the terminals of the cells and a bus bar. The terminal plates of the bus bar module are secured to the externally threaded terminals of the plurality of cells by nuts. As such, the bus bar module extends the entire length of the battery pack. To gain access to the individual battery cell, all of the nuts along the length of the bus bar module must be removed in order to remove the bus bar module.

Accordingly, a need exists for a device that enables quick access to each battery cell within the battery pack while providing voltage and current from the battery pack to a component of the vehicle.

SUMMARY

In one embodiment, a battery pack assembly is provided. The battery pack assembly includes a housing and a plurality of battery cells. The housing includes a pair of sidewalls and a pair of end walls that define a cavity, and a pair of lids. The pair of lids are hingedly attached to each of the pair of sidewalls. Each lid of the pair of lids has an interior surface. Each lid of the pair of lids moves between an open position and a closed position. A plurality of terminal connectors are positioned on each inner surface of each of the pair of lids. The plurality of battery cells are positioned within the cavity. Each battery cell of the plurality of battery cells has a pair of terminals. When each lid of the pair of lids is in the closed position, each of the plurality of terminal connectors are communicatively coupled to a corresponding terminal of the pair of terminals of each battery cell of the plurality of battery cells.

In another embodiment, a battery pack assembly is provided. The battery pack assembly includes a housing and a plurality of battery cells. The housing includes a pair of sidewalls and a pair of end walls defining a cavity, an elongated member extending between the pair of end walls, and a pair of lids are hingedly attached to each of the pair of sidewalls. Each lid of the pair of lids having an interior surface. Each lid of the pair of lids move between an open position and a closed position. A circuit board is coupled to the interior surface of each of the pair of lids. A plurality of terminal connectors are positioned on each inner surface of each of the pair of lids and communicatively coupled to the respective circuit board. The plurality of battery cells are positioned within the cavity. In the closed position, each lid of the pair of lids is electrically coupled to the plurality of battery cells.

In yet another embodiment, a method of removing a battery cell from a battery pack assembly is provided. The method includes removing a fastener from a post that extends between each of a pair of lids, pivoting the pair of lids from a closed position to an open position and removing at least one battery cell from the battery pack assembly.

These and additional objects and advantages provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 schematically depicts a partial perspective view of the battery pack assembly of FIG. 1 in an open position, according to one or more embodiments shown or described herein;

FIG. 4 schematically depicts a perspective view of a battery cell of the battery pack assembly of FIG. 1, according to one or more embodiments described herein;

DETAILED DESCRIPTION

Embodiments described herein generally relate to a battery pack assembly. The battery pack assembly includes a housing and a plurality of battery cells. The housing includes a pair of sidewalls, a pair of end walls and a floor that define a cavity that houses the plurality of battery cells. The housing further includes an elongated member that extends between the pair of end walls and a pair of lids that are hingedly coupled to an upper surface of the pair of sidewalls. The pair of lids extend across a length of the battery pack. The pair of lids move or rotatably pivot between an open position, which permits access to the plurality of battery cells and a closed position, which retains the plurality of battery cells.

Each of the pair of lids further includes a circuit board and a plurality of terminal connectors communicatively coupled to each respective circuit board. Further, each battery cell has a terminal side and an opposite housing side. A pair of terminals extend from each of the plurality of battery cells on the terminal side.

In the closed position, the plurality of terminal connectors are configured to communicatively couple to the respective terminal of the pair of terminals of each battery cell. The pair of lids are secured in a locked position when at least one fastener is coupled to at least one post that extends upwardly from the elongated member. In the open position, the at least one fastener is removed from the corresponding at least one post. As such, the plurality of terminal connectors are removed from contact with the pair of terminals of each battery cell of the plurality of battery cells and access to each battery cell of the plurality of battery cells is permitted such that each battery cell may be easily and quickly removed from the housing of the battery pack assembly.

As used herein, the term "communicatively coupled" means that coupled components are capable of exchanging electric signals with one another such as, for example, electrical energy via conductive medium or a non-conductive medium, and the like.

Figure 1:
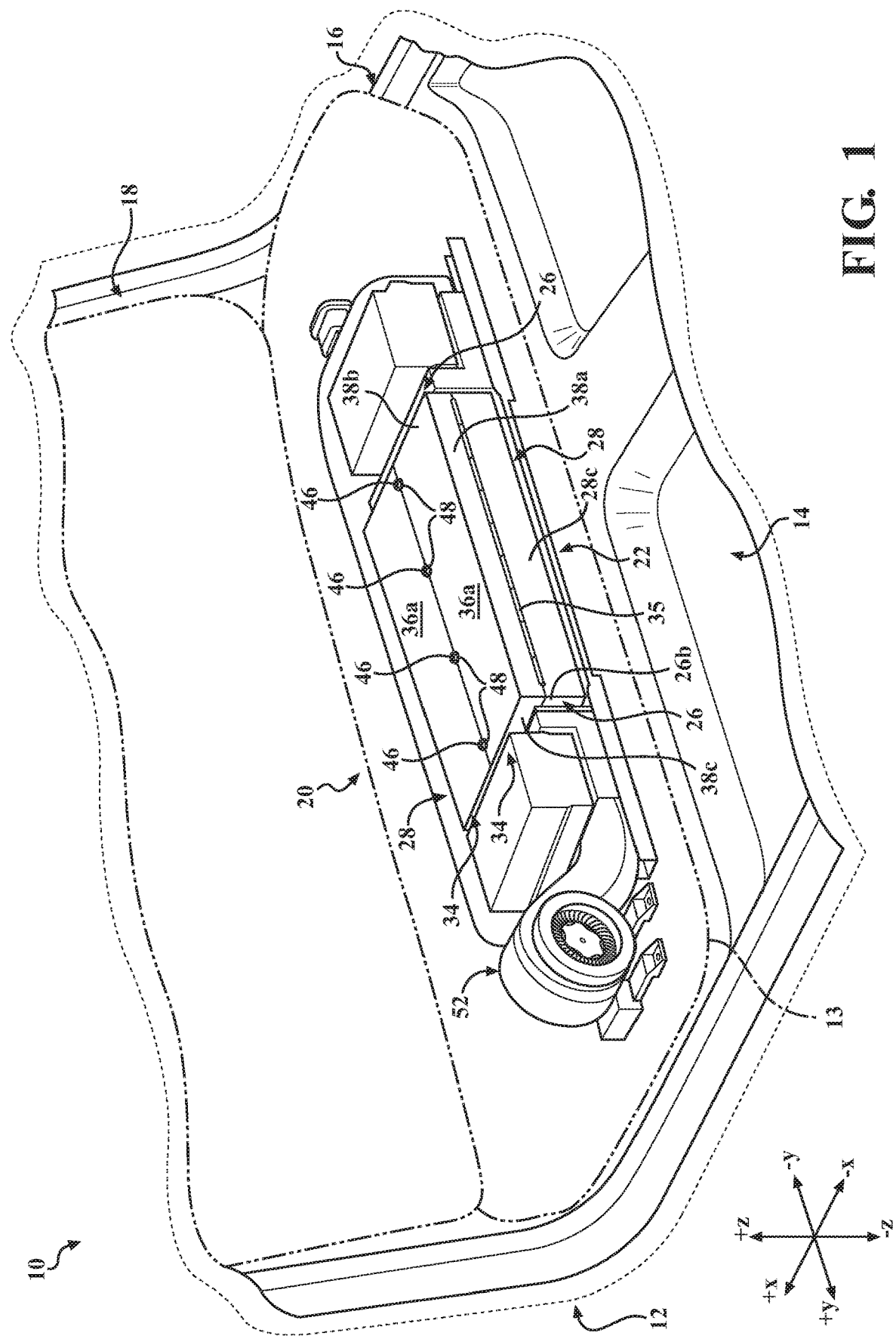
FIG. 1 schematically depicts a partial view of a vehicle and a battery pack assembly, according to one or more embodiments shown or described herein.

As used herein, the term "longitudinal direction" refers to the forward-rearward direction of the battery pack assembly (i.e., in the +/−X-direction depicted in FIG. 1). The term "lateral direction" refers to the cross-battery pack assembly direction (i.e., in the +/−Y-direction depicted in FIG. 1), and is transverse to the longitudinal direction. The term "vertical direction" or "up" or "above" refer to the upward-downward direction of the battery pack assembly (i.e., in the +/−Z-direction depicted in FIG. 1).

Vehicles that incorporate elements according to the present disclosure may include a variety of battery pack assemblies that are conventionally known, including battery pack assemblies that are used in marine applications such as within boats, aerospace applications such as within airplanes, and/or in vehicle applications, such as cars, trucks, sport utility vehicles, and the like. It should be appreciated that the vehicle may be a hybrid vehicle, an electric vehicle, a conventional vehicle, and the like. Further, battery pack assemblies may be used in home applications, such as tools, appliances, and the like.

Figure 2:
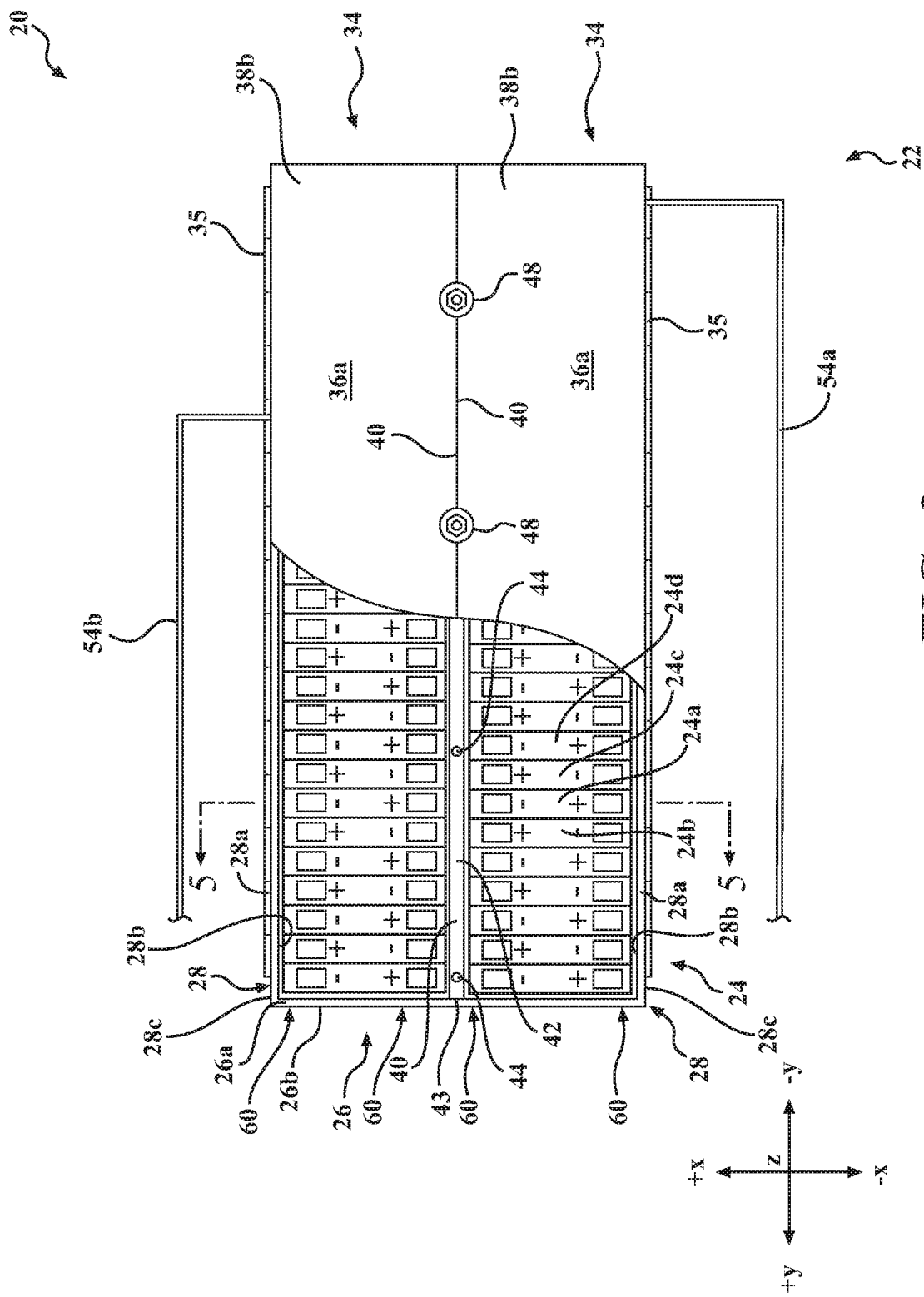
FIG. 2 schematically depicts a top view of the battery pack assembly of FIG. 1, according to one or more embodiments shown or described herein.

Referring to FIGS. 1 and 2, a vehicle 10 including a passenger compartment 12 is shown. The passenger compartment 12 includes a seat 13 and a seat frame 14. The seat frame 14 includes a seat portion 16 and a seat back portion 18. A battery pack assembly 20 is positioned within or mounted below the seat portion 16 of the seat frame 14. It should be appreciated that the battery pack assembly 20 may be positioned anywhere within the passenger compartment 12, an engine compartment, a storage compartment, such as a trunk or a truck bed, and the like, within the vehicle 10 It is appreciated that the battery pack assembly 20 may be positioned within or mounted to a frame of the vehicle 10.

The battery pack assembly 20 includes a housing 22 that houses a plurality of battery cells 24. It should be appreciated that the plurality of battery cells 24 includes a plurality of individual battery cells 24a. It should also be appreciated that the plurality of battery cells 24 are illustrated as being in two rows in the lateral direction (i.e. in the +/−Y direction), this is non-limiting and the plurality of battery cells 24 may be positioned within the housing 22 in a plurality of configurations and arrangements. For instance, the plurality of battery cells 24 may be positioned within the housing 22 in a column configuration, or in the longitudinal direction (i.e., in the +/−Z direction).

Figure 5:
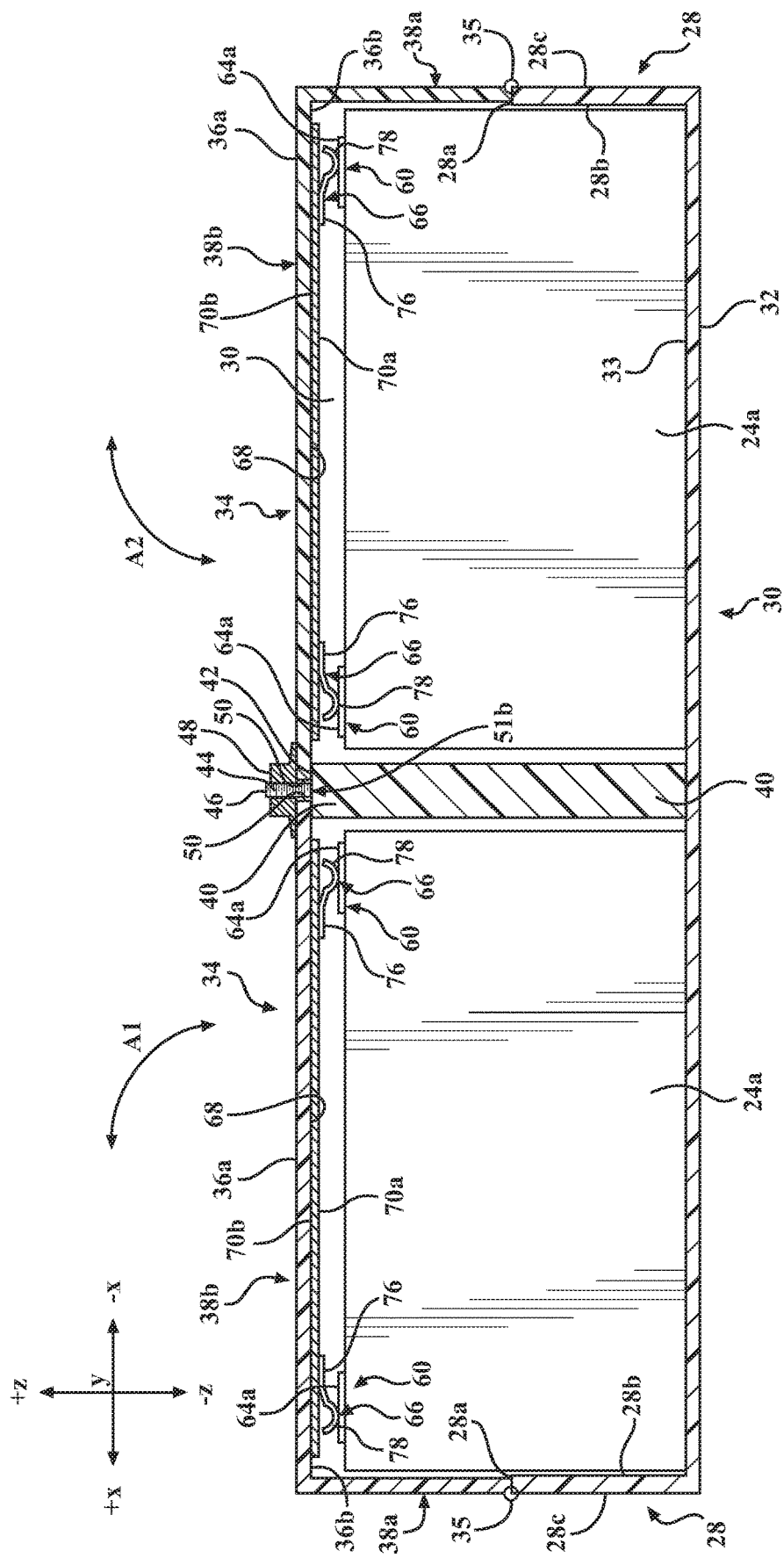
FIG. 5 schematically depicts a partial cross-sectional view of the battery pack assembly of FIG. 1 in a closed position taken from the line 5-5, according to one or more embodiments described herein.
Figure 6:
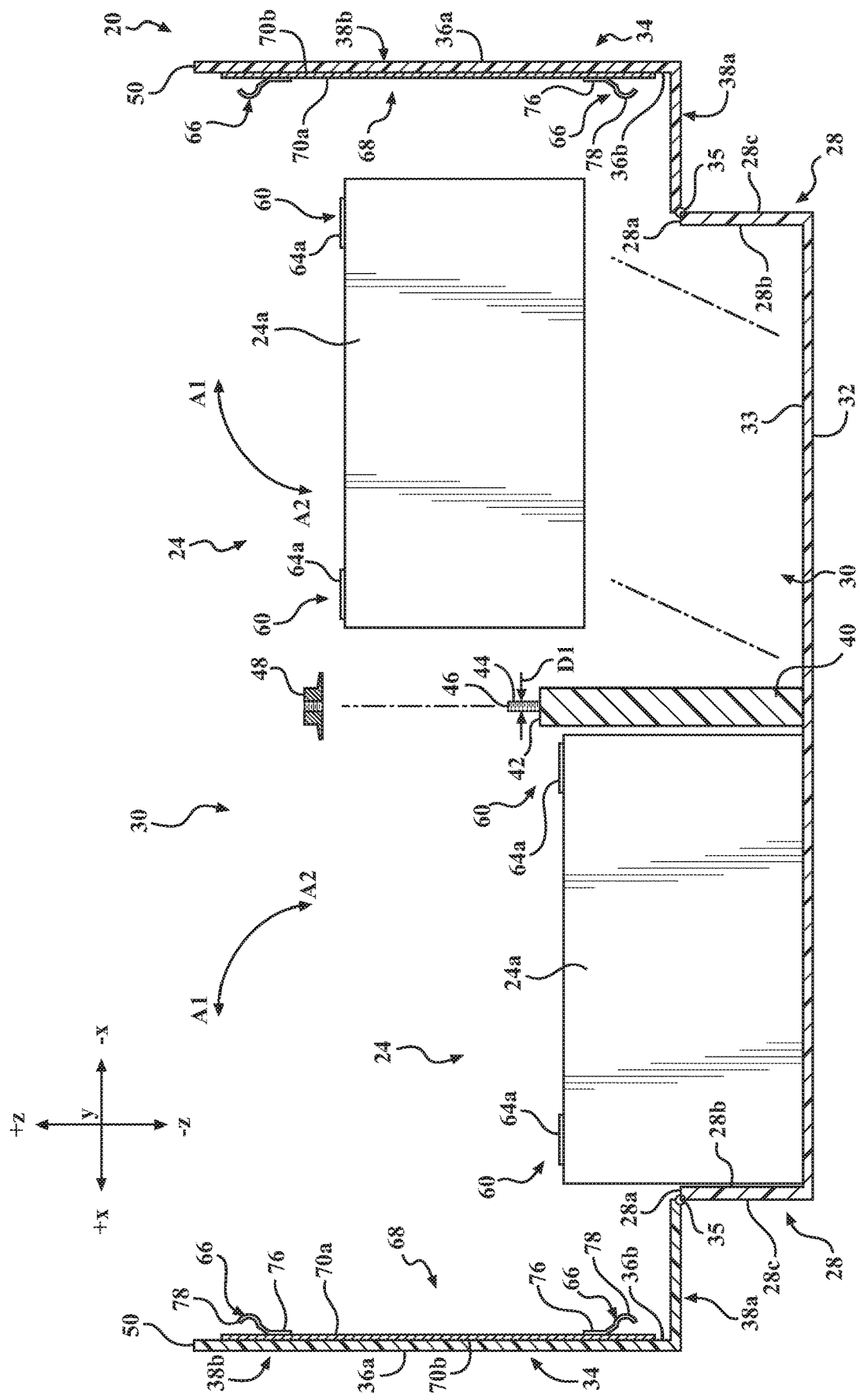
FIG. 6 schematically depicts a partial cross-sectional view of the battery pack assembly of FIG. 3 in the open position taken from the line 6-6, according to one or more embodiments described herein.

The housing 22 includes a pair of end walls 26 and the pair of sidewalls 28 that define a cavity 30 (FIGS. 5-6) that includes a floor 32 (FIGS. 5-6) with a floor surface 33 (FIGS. 5-6). In some embodiments, the end walls 26 and the sidewalls 28 each extend in the vertical direction (i.e., in the +/−Z direction). Further, in some embodiments, the end walls 26 each extend in the vertical direction (i.e., in the +/−Z direction) a greater distance than the sidewalls 28. The end walls 26 include an interior surface 26a and an opposite exterior surface 26b. The sidewalls 28 further include an upper surface 28a, an inner surface 28b and an opposing outer surface 28c. The inner surface 28b is positioned within the cavity 30 and the outer surface 28c is positioned outside of each of the plurality of battery cells 24.

Referring to FIGS. 2 and 4, each battery cell 24a of the plurality of battery cells 24 include a terminal side 56a and an opposite housing side 56b. Each battery cell 24a of the plurality of battery cells 24 are communicatively coupled in series with each other. It should be understood that each row is communicatively coupled to other rows such that each of the plurality of battery cells 24 are communicatively coupled in series. As such, adjacent battery cells 24b, 24c of the battery cell 24a of the plurality of battery cells 24 is positioned or arranged such that the polarity of the adjacent battery cells 24b, 24c is reversed compared to the adjacent battery cell 24b. That is, in one example, the battery cell 24a is arranged within the housing 22 with a positive terminal nearest to the outer surface 28c of a pair of sidewalls 28 of the housing 22 while a negative terminal is nearest to a center of the cavity 30 of the housing 22. The adjacent battery cells 24b, 24c are each arranged within the housing 22 with a positive terminal nearest to the cavity 30 of the housing 22 while a negative terminal is nearest to the outer surface 28c of the sidewalls 28 of the housing 22. As such, it is understood that the positive terminal of each of the plurality of battery cells 24 alternates such that every other battery cell has the same positive terminal polarity arrangement and the same applies for each negative terminal of the plurality of battery cells 24.

A pair of load wires 54a, 54b are communicatively coupled to the plurality of battery cells 24 such that an energy stored within the plurality of battery cells 24 may be transferred from the plurality of battery cells 24 to another component of the vehicle 10 and/or an energy may be transferred to the plurality of battery cells 24 via the pair of load wires 54a, 54b. It should be appreciated that the pair of load wires 54a. 54b may be a busbar, a wire, or other conductive medium that transfers the energy stored within the plurality of battery cells 24 to the components of the vehicle 10. In some embodiments, the component of the vehicle 10 may be a powertrain component. In other embodiments, the vehicle component is an inverter, a relay, fuses, other electrical components, and the like. It should be understood that the energy stored and/or transferred may be a voltage, a current, a power, and the like. In some embodiments, some battery cells of the plurality of battery cells 24 may extend at a height greater than the other battery cells of the plurality of battery cells 24 in the vertical direction (i.e., in the +/−Z direction). For instance, one row of battery cells of the plurality of battery cells 24 may be at a height greater than the other battery cells of the plurality of battery cells 24 in other rows in the vertical direction (i.e., in the +/−Z direction). In other embodiments, some battery cells within a row in the lateral direction (i.e., in the +/−Y direction) may also be at a height greater than the other battery cells in the same row in the vertical direction (i.e., in the +/−Z direction). For instance, every other battery cell may be at a height greater than the adjacent battery cell in the vertical direction (i.e., in the +/−Z direction). It should be understood that the above are non-limiting examples and that each battery cell of the plurality of battery cells may be in any configuration in any direction, such as angled, in varying heights, and the like.

The size and shape of the battery cells 24 may depend on predetermined specifics such as the amount of energy to be stored, a temperature response of the battery cell, an amount of energy the vehicle requires, and the like. As such, the type of the battery cells 24 may vary. In some embodiments, the battery cells 24 is lithium ion (LI-Ion). In other embodiments, the battery cells 24 is a Molten Salt (Na—NiCl2), a Nickel Metal Hydride (Ni-MH), a Lithium Sulphur (Li—S), and the like.

Referring now to FIG. 4, an isolated view of the battery cell 24a of the plurality of battery cells 24 is schematically depicted. It should be understood that while only the battery cell 24a of the plurality of battery cells 24 is described, the features apply to each battery cell of the plurality of battery cells 24. The battery cell 24a includes a terminal side 56a and an opposite housing side 56b. Further, the battery cell 24a includes a terminal surface 58a, which faces the terminal side 56a and a housing surface 58b that, in some embodiments, abuts the floor surface 33 (FIG. 5) of the housing 22 (FIG. 5). In other embodiments, the housing surface 58b is adjacent to the floor surface 33 (FIG. 5) of the floor 32 (FIG. 5) of the housing 22 (FIG. 5). As such, in this embodiment, the battery cell 24a may not be in contact with the floor surface 33 (FIG. 5) of the floor 32 (FIG. 5) of the housing 22 (FIG. 5). In other embodiments, portions of the housing surface 58b are in contact with portions of the floor surface 33 (FIG. 5) of the floor 32 (FIG. 5) of the housing 22 (FIG. 5).

In some embodiments, a pair of terminals 60 extend from the terminal surface 58a of the battery cell 24a into the terminal side 56a. One of the pair of terminals 60 is generally known as a positive terminal and the other terminal of the pair of terminals 60 is generally known as a negative terminal. The pair of terminals 60 are each provided with a terminal engagement portion 62 that extends upwardly from the terminal surface 58a of the battery cell 24a in the vertical direction (i.e., in the +/−Z direction). In some embodiments, the pair of terminals 60 extend upwardly from the terminal surface 58a and have a generally cylindrical shape and the terminal engagement portion 62 is formed at a distal end of the pair of terminals 60.

In some embodiments, each terminal engagement portion 62 of the pair of terminals 60 may extend outwardly across the terminal surface 58a of the battery cell 24a in the lateral direction (i.e., in the +/−Y direction). In some embodiments, the terminal engagement portion 62 may be an elongated member having a terminal engagement exterior surface 64a and an opposite terminal engagement interior surface 64b. The terminal engagement exterior surface 64a faces the terminal side 56a and the terminal engagement interior surface 64b faces the terminal surface 68a. In some embodiments, at least a portion of the terminal engagement interior surface 64b is in contact with the terminal surface 58a. In other embodiments, the at least one portion of the terminal engagement interior surface 64b does not make contact with the terminal surface 68a.

Referring now to FIGS. 1-3, the housing 22 further includes an elongated member 40. The elongated member 40 includes an upper surface 42 that may be positioned above each battery cell of the plurality of battery cells 24 in the vertical direction (i.e., in the +/−Z direction). The elongated member 40 is positioned between each row of the plurality of battery cells 24. Further, in some embodiments, the elongated member 40 extends the width of the housing 22 in the lateral direction (i.e., in the +/−Y direction). In some embodiments, the elongated member 40 is a unitary construction with the floor 32 (FIG. 5) of the housing 22. In other embodiments, the elongated member 40 extends from the floor surface 33 (FIG. 5) of the floor 32 (FIG. 5) such that the elongated member 40 is a separate, or removable component, of the housing 22. In this embodiment, the elongated member 40 may be coupled to the interior surface 26a of each of the end walls 26 via a pair of channels 43 that extend along the interior surface 26a of each of the end walls 26 to retain the elongated member 40. In other embodiments, the elongated member 40 is retained by a groove, by a fastener such as a screw, a rivet, a bolt and a nut, and the like. In some embodiments, each of the plurality of battery cells 24 may be removed from the battery pack assembly 20 without removing the elongated member 40. In other embodiments, to remove at least one battery cell of the plurality of battery cells 24, the elongated member 40 may need to also be removed.

At least one post 44 extends upwardly from an upper surface 42 of the elongated member 40 in the vertical direction (i.e., in the +/−Z direction). In some embodiments, the at least one post 44 may be cylindrical and has a post diameter D1 (FIG. 6). In other embodiments, the at least one post 44 may be a square, a rectangle, an octagon, and the like. As such, it should be appreciated that the at least one post 44 may be a uniform shape or an irregular shape. Further, in some embodiments, each post of the at least one post 44 extends an equal length from the upper surface 42 in the vertical direction (i.e., in the +/−Z direction) beyond the cavity 30. In other embodiments, each post of the at least one post 44 extends from the upper surface 42 in the vertical direction (i.e., in the +/−Z direction) a different height that at least one other post of the at least one post 44. In some embodiments, at least a distal end 46 of the at least one post 44 is threaded such that at least one nut 48 may be rotatably coupled to the corresponding at least one post 44 to retain objects, such as a pair of lids 34, as discussed in greater detail herein. In other embodiments, the at least one post 44 includes a bore such that a clip, a pin, or a resilient member may have a portion inserted into the bore and other portions are configured to retain objects.

Referring to FIGS. 1-3 and FIGS. 5-6, the housing 22 further includes the pair of lids 34 hindedly attached, via a hinge mechanism 35, to the upper surface 28a of the pair of sidewalls 28. The pair of lids 34 each include an exterior surface 36a and an interior surface 36b to define a thickness. In some embodiments, each of the pair of lids 34 is an "L" shape such that the pair of lids 34 include a sidewall portion 38a and a cover portion 38b. The sidewall portion 38a of the pair of lids 34 completes the pair of sidewalls 28. In other embodiments, each of the pair of lids 34 is a "T" shape, a box shape, a square shape, a rectangular shape, or other shapes such that the pair of lids 34 include the sidewall portion 38a, the cover portion 38b, and an end wall portion 38c. The end wall portion 38c of the pair of lids 34 completes the pair of end walls 26.

Further, in some embodiments, the thickness of the pair of lids 34 are equal and uniform between the sidewall portion 38a, the cover portion 38b and the end wall portion 38c. In other embodiments, the thickness of the sidewall portion 38a is greater than the thickness of the cover portion 38b and/or the end wall portion 38c. In yet other embodiments, the thickness of the cover portion 38b is greater than the thickness of the sidewall portion 38a and/or the end wall portion 38c. Further, in some embodiments, the thickness of the sidewall portion 38a and/or the thickness of the cover portion 38b and/or the end wall portion 38c may be irregular. For example, the thickness of the sidewall portion 38a may be greater at the hinge mechanism 35 than at a portion where the sidewall portion 38a connects to the cover portion 38b. In another example, the thickness of the cover portion 38b may be less at an end than in a middle portion and vice versa.

In some embodiments, the interior surface 36b of the pair of lids 34 each include a circuit board 68. The circuit board 68 includes a circuit board interior surface 70a and an opposite circuit board exterior surface 70b that define a thickness. In some embodiments, the thickness of each circuit board 68 is equal and uniform. In other embodiments, the thickness of one circuit board 68 is greater than the thickness of the other circuit board 68. In yet other embodiments, the thickness of each circuit board 68 may be irregular. For example, the thickness of the circuit board 68 may be greater at each end than a middle portion. In another example, the thickness of the circuit board 68 may be greater at the middle portion than at the ends.

The circuit board exterior surface 70b abuts the interior surface 36b of each lid of the pair of lids 34. The circuit board interior surface 70a is positioned near or within the terminal side 56a of the plurality of battery cells 24. The circuit board 68 may be a flexible board, a printed circuit board, and the like. In some embodiments, the circuit board interior and exterior surfaces 70a, 70b may be an insulated material such as epoxy, paper, acrylic, fiberglass, resin and the like.

It should be appreciated that, in some embodiments, the circuit board 68 may have a plurality of layers of the insulated material arranged in the vertical direction (i.e., in the +/−Z direction) with different materials between the layers, such as a conductive material that is used as traces, conductive paths, and the like, to form a conductive member 72, as discussed in greater detail herein. In other embodiments, the circuit board exterior surface 70b may be one insulating material, the circuit board interior surface 70a is the same or a different insulating material, and there may be layers of insulating material therebetween, a single insulating layer, a single conductive layer, a combination thereof, and the like, as discussed in greater detail herein.

In some embodiments, the circuit board exterior surface 70b may be coupled to the interior surface 36b of each lid of the pair of lids 34 via an adhesive, an epoxy, a resin, and the like. In other embodiments, the circuit board 68 is coupled to the interior surface 36b of each lid of the pair of lids 34 via at least one fastener. The at least one fastener may be a screw, a bolt and nut, a rivet, and the like. In this embodiment, the interior surface 36b of each lid of the pair of lids 34 may further include at least one receiving cavity for receiving the at least one fastener. Further, in this embodiment, the circuit board 68 may include at least one aperture that corresponds to the at least one receiving cavity and receives the at least one fastener.

Still referring to FIGS. 1-3 and 5-6, in some embodiments, a plurality of terminal connectors 66 extend from each circuit board interior surface 70a of the circuit board 68 coupled to each pair of lids 34. In some embodiments, the plurality of terminal connectors 66 are paired. In this embodiment, the conductive member 72 is positioned between each pair of the plurality of terminal connectors 66. As such, it should be appreciated that plurality of terminal connectors 66 are independently communicatively coupled to the conductive member 72, as discussed in greater detail herein.

In this embodiment, one of the pair of the plurality of terminal connectors 66 are positioned adjacent, or near an edge 50 of each cover portion 38b of each lid of the pair of lids 34 and a communicatively coupled second pair of the plurality of terminal connectors 66 are positioned near the sidewall portion 38a of each lid of the pair of lids 34. Each pair of the plurality of terminal connectors 66 may be offset from one of the next coupled pair of the plurality of terminal connectors 66 and the plurality of terminal connectors 66 positioned to correspond to the pair of terminals 60 each of battery cell 24a of the plurality of battery cells 24 when the pair of lids 34 are in the closed position. That is, one pair of the plurality of terminal connectors 66 is configured to communicatively couple a positive polarity terminal 60 from the battery cell 24a of the plurality of battery cells 24 to a negative polarity terminal 60 of the adjacent battery cell 24c of the plurality of battery cells 24. The other pair of the of the plurality of terminal connectors 66 is configured to communicatively couple a negative polarity terminal 60 from the adjacent battery cell 24c of the plurality of battery cells 24 to a positive polarity terminal 60 of a second adjacent battery cell 24d of the plurality of battery cells 24. It should be understood that this pattern continues throughout the plurality of battery cells 24 such that each of the plurality of battery cells 24 are arranged in a series configuration.

In other embodiments, one pair of the plurality of terminal connectors 66 is configured to communicatively couple the negative polarity terminal 60 from the battery cell 24a of the plurality of battery cells 24 to the positive polarity terminal 60 of the adjacent battery cell 24c of the plurality of battery cells 24. The next pair of the plurality of terminal connectors 66 is configured to communicatively couple the positive polarity terminal 60 from the adjacent battery cell 24c of the plurality of battery cells 24 to the negative polarity terminal 60 of a second adjacent battery cell 24d of the plurality of battery cells 24.

In embodiments, each pair of the plurality of terminal connectors 66 are communicatively coupled to the conductive member 72. As such, the conductive member 72, extending through the circuit board 68, communicatively couples the plurality of terminals 60 and the plurality of terminal connectors 66 to the load wires 54a, 54b. It should be appreciated that, in some embodiments, the load wires 54a, 54b may be communicatively coupled to the conductive member 72 via lugs, terminals, solder, and the like. In other embodiments, the load wires 54a, 54b may be communicatively coupled to at least two of the plurality of terminal connectors 66 via lugs, terminals, solder, and the like. As such, it is understood that each pair of the plurality of terminal connectors 66 and the conductive member 72 complete or close an electrical circuit between adjacent battery cells of the plurality of battery cells 24 such that each pair of the plurality of terminal connectors 66 and each conductive member 72 daisy chain, or electrically position the plurality of battery cells 24 into a series configuration, and such that energy may be transferred from the plurality of battery cells 24 to the load wires 54a, 54b and/or energy may be transferred to the plurality of battery cells 24 via the load wires 54a, 54b when the lids 34 are in the closed position, as discussed in greater detail herein. That is, the plurality of terminal connectors 66 and each conductive member 72 together electrically position the plurality of battery cells 24 into a series configuration such that the energy stored in or received by each battery cell of the plurality of battery cells 24 is maximized for transfer to other components of the vehicle 10 or for recharging.

Each of the plurality of terminal connectors 66 includes a leg portion 76 and a curvilinear portion 78. The leg portion 76 is communicatively coupled to the circuit board interior surface 70a via a conductive medium, such as a solider, an epoxy, a resin and the like. In some embodiments, the curvilinear portion 78 is a resilient member that is configured to move between a contact position and a normal position such that in the contact position, the terminal engagement portion 62 moves upwardly in the vertical direction (i.e., in the +/−Z direction) when the curvilinear portion 78 of the plurality of terminal connectors 66 makes contact with at least a portion of the plurality of terminals 60 of the plurality of battery cells 24.

The curvilinear portion 78 of the plurality of terminal connectors 66 may be a uniform shape or an irregular shape. Further, each curvilinear portion 78 of the plurality of terminal connectors 66 may all have the same shape or there may be a plurality of different shapes among the curvilinear portion 78 of the plurality of terminal connectors 66. In some embodiments, each curvilinear portion 78 extends an equal vertical distance away (i.e., in the +/−Z direction) from the circuit board interior surface 70a. In other embodiments, each of the curvilinear portion 78 may extend a different or varying vertical distance away (i.e., in the +/−Z direction) from the circuit board interior surface 70a.

In some embodiments, the plurality of terminal connectors 66 extend in a direction, or pattern, transverse to the pair of terminals 60 of each battery cell 24a of the plurality of battery cells 24. That is, in some embodiments, when the pair of terminals 60 are arranged along the terminal surface 58a in the lateral direction (i.e., in the +/−Y direction), the plurality of terminal connectors 66 extend in the longitudinal direction (i.e., in the +/−X direction) along the circuit board interior surface 70a. In other embodiments, when the pair of terminals 60 are arranged along the terminal surface 58a in the longitudinal direction, (i.e., in the +/−X direction), as illustrated, the plurality of terminal connectors 66 extend in the lateral direction (i.e., in the +/−Y direction) along the circuit board interior surface 70a.

In some embodiments, the plurality of terminal connectors 66 and the conductive member 72 are each a conductive metal material such as silver (Ag), copper (Cu), gold (Au), aluminum (Al), and the like. In other embodiments, the plurality of terminal connectors 66 and the conductive member 72 are each a conductive material such as a beryllium (Be), calcium (Ca) magnesium (Mg), rhodium (Rh), sodium (Na), iridium (Ir), and the like.

In other embodiments, the plurality of terminal connectors 66 and/or the conductive member 72 is communicatively coupled to a first and second conductive paths. In this embodiment, the first and second conductive paths extend through the circuit board 68 and, in some embodiments, are each positioned between the circuit board interior and exterior surfaces 70a, 70b of the circuit board 68. That is, the first and second conductive paths may be sandwiched between insulating materials. As such, the first and second conductive paths are each electrically insulated from any component above or below, in front or behind, and on both sides, including the other conductive path of the circuit board 68. As such, in some embodiments, each of the first and second conductive paths may be a trace. In this embodiment, the first conductive path is configured to communicatively couple a positive polarity terminal 60 from the battery cell 24a of the plurality of battery cells 24 to a negative polarity terminal 60 of the adjacent battery cell 24c of the plurality of battery cells 24. Additionally, in this embodiment, the second conductive path is configured to communicatively couple a negative polarity terminal 60 from the adjacent battery cell 24c of the plurality of battery cells 24 to a positive polarity terminal 60 of a second adjacent battery cell 24d of the plurality of battery cells 24. It is understood that the opposite configuration is also possible, similar to the embodiments described above.

As such, it is understood that the first and second conductive paths complete or close the electrical circuit between adjacent battery cells of the plurality of battery cells 24 such that the first and second conductive paths daisy chain, or electrically position the plurality of battery cells 24 into a series configuration, similar to the manner described above. As such, in this embodiment, the first and second conductive paths are communicatively coupled to the pair of terminals 60 of each battery cell of the pair of battery cells 24 via the plurality of terminal connectors 66, similar to the above described embodiments. That is, the first and second conductive paths are configured to carry the energy stored within each of the plurality of battery cells 24 respectively and ultimately to the pair of load wires 54a, 54b. In some embodiments, the first and second conductive paths are each a conductive metal material such as silver (Ag), copper (Cu), gold (Au), aluminum (Al), and the like. In other embodiments, the first and second conductive paths are each a conductive material such as a beryllium (Be), calcium (Ca) magnesium (Mg), rhodium (Rh), sodium (Na), iridium (Ir), and the like.

The pair of lids 34 are configured to move between an open position, as illustrated in FIG. 3, and a closed position, as illustrated in FIG. 1. That is, the pair of lids 34 are independently movably, or rotatably pivoted between a horizontal position, at the closed position, to a vertical position, at the open position. In the closed position, the interior surface 36b of the pair of lids 34 faces the cavity 30 and the exterior surface 36a of the pair of lids 34 face in a direction opposite of the cavity 30. As such, when the lids 34 are in the closed position, the curvilinear portion 78 of each of the plurality of terminal connectors 66 make contact or are engaged with the plurality of terminals 60 of the plurality of battery cells 24. As such, the plurality of terminal connectors 66 and the conductive member 72 positioned on the pair of lids 34 provide a conductive medium such that an energy stored in of each of the plurality of battery cells 24 may be carried through the pair of lids 34 to a different component of the vehicle 10, such as a powertrain, an inverter, and the like, through the load wires 54a, 54b.

In some embodiments, in the closed position, each edge 50 of the pair of lids 34 rests on the upper surface 42 of the elongated member 40. In this embodiment, each edge 50 of the pair of lids 34 includes a plurality of notches 51a that corresponds to the at least one post 44 of the elongated member 40 such that when the pair of lids 34 are in the closed position, each of the plurality of notches 51a form an opening 51b for the at least one post 44 of the elongated member 40 to extend therethrough.

It should be appreciated that once each lid of the pair of lids 34 are in the closed position, at least the distal end 46 of the at least one post 44 extends through the opening 51b such that the at least one nut 48 may be received by the distal end 46 of the at least one post 44. Once the at least one nut 48 is received by the distal end 46 of the at least one post 44, the pair of lids 34 are in a locked position. The locked position is similar to the closed position with the exception that in the locked position, the pair of lids 34 are inhibited from moving from the closed position to the open position in the direction of arrow A2. As such, in the locked position, access to the plurality of battery cells 24 is inhibited. Further, in the locked position, the pair of lids 34 assist in retaining the plurality of battery cells 24 within the housing 22.

In other embodiments, each edge 50 of the cover portion 38b of each lid of the pair of lids 34 are spaced apart forming a gap such that in the closed position, the at least one post 44 extends through the gap. In this embodiment, once the pair of lids 34 are in the closed position, at least the distal end 46 of the at least one post 44 extends through the gap such that the at least one nut 48 may be received by the distal end 46 of the at least one post 44. Once the at least one nut 48 is received by the distal end 46 of the at least one post 44, the at least one nut 48 retains each edge 50 of the pair of lids 34 between the at least one nut 48 and against the upper surface 42 of the elongated member 40 in a locked positon. The locked position is similar to the closed position with the exception that in the locked position, the pair of lids 34 are inhibited from moving from the closed position to the open position in the direction of arrow A2. As such, in the locked position, access to the plurality of battery cells 24 is inhibited. Further, in the locked position, the pair of lids 34 assist in retaining the plurality of battery cells 24 within the housing 22. In other embodiments, the edge 50 of the cover portion 38b of one lid of the pair of lids 34 is longer than the edge 50 of the cover portion 38b of the other lid of the pair of lids 24 in the lateral direction (i.e., in the +/−Y direction) such that in the closed and locked positions, the edge 50 that is longer overlaps the edge 50 that is shorter. In this embodiment, each edge 50 includes at least one aperture. In the locked position, each aperture of the cover portion 38b overlap one another such that the apertures are co-axially aligned with one another. The distal end 46 of the at least one post 44 passes through each aperture such that the at least one nut 48 may secure the pair of lids 34 between the at least one nut 48 and the upper surface 42 of the elongated member 40.

In the open position, the pair of lids 34 are moved from the closed position along the direction illustrated by arrow A2 to the open position. While in the open position, the interior surface 36b of the pair of lids 34 and the exterior surface 36a of the pair of lids 34 are vertical such that both the interior and exterior surfaces 36a, 36b are perpendicular to the terminal side 56a of the plurality of battery cells 24. As such, the curvilinear portion 78 of each of the plurality of terminal connectors 66 disengaged from, or do not make contact with the plurality of terminals 60 of the plurality of battery cells 24. The open position permits access to the plurality of battery cells 24 such that at least one battery cell of the plurality of battery cells 24 may be removed and/or inserted into the battery pack assembly 20. It should be appreciated that the pair of lids 34 may be returned to the closed position along the direction illustrated by arrow A1.

The battery pack assembly 20 further includes a cooling mechanism 52. The cooling mechanism 52 forces airflow above and/or beneath each battery cell of the plurality of battery cells 24 to cool the plurality of battery cells 24.

Referring to FIG. 4, in some embodiments, the terminal engagement portion 62 is a rigid elongated member that receives the plurality of terminal connectors 66. In some embodiments, at least a portion of the plurality of terminal connectors 66 contact with at least a portion of the terminal engagement exterior surface 64a of the terminal engagement portion 62, as discussed in greater detail herein. As such, the terminal engagement portion 62 may be a tab or the like, and have a square shape, a rectangle shape, an octagon shape, and the like. As such, it should be appreciated that the terminal engagement portion 62 may be a uniform shape or an irregular shape. In other embodiments, the terminal engagement portion 62 includes an aperture that extends through the terminal engagement exterior surface 64a and the terminal engagement interior surface 64b. The aperture is configured to receive a corresponding terminal connector of the plurality of terminal connectors 66 of the pair of lids 34.

In other embodiments, the terminal engagement portion 62 is a resilient member that is configured to move between a contact position and a normal position such that in the contact position the terminal engagement portion 62 moves downwardly in the vertical direction (i.e., in the +/−Z direction) when the plurality of terminal connectors 66 of the pair of lids 34 make contact with at least a portion of the terminal engagement exterior surface 64a. The terminal engagement portion 62 may be a tab or the like and have a square shape, a rectangle shape, an octagon shape, and the like. As such, it should be appreciated that the terminal engagement portion 62 may be a uniform shape or an irregular shape. In other embodiments, the terminal engagement portion 62 includes an aperture that extends through the terminal engagement exterior surface 64a and the terminal engagement interior surface 64b. The aperture is configured to receive a corresponding terminal connector of the plurality of terminal connectors 66 of the pair of lids 34.

Further, in some embodiments, each terminal engagement portion 62 of the pair of terminals 60 extend an equal length from the terminal surface 58a in the vertical direction (i.e., in the +/−Z direction) into the terminal side 56a of the battery cell 24a and in the longitudinal direction (i.e., in the +/−X direction) across the terminal surface 58a of the battery cell 24a. In other embodiments, one terminal engagement portion 62 of the pair of terminals 60 extends from the terminal surface 58a in the vertical direction (i.e., in the +/−Z direction), a different height than the other terminal engagement portion 62 of the pair of terminals 60. For example, in some embodiments, each negative terminal may extend at a height greater than the positive terminal in the vertical direction (i.e., in the +/−Z direction). In other embodiments, each positive terminal may extend at a height greater than the negative terminal in the vertical direction (i.e., in the +/−Z direction). Further, in other embodiments, one terminal engagement portion 62 of the pair of terminals 60 extends across the terminal surface 58a of the battery cell 24a in the longitudinal direction (i.e., in the +/−X direction), a different length than the other terminal engagement portion 62 of the pair of terminals 60. For example, in some embodiments, each negative terminal may extend at a length greater than the positive terminal in the longitudinal direction (i.e., in the +/−X direction). In other embodiments, each positive terminal may extend at a length greater than the negative terminal in the longitudinal direction (i.e., in the +/−X direction).

Figure 7:
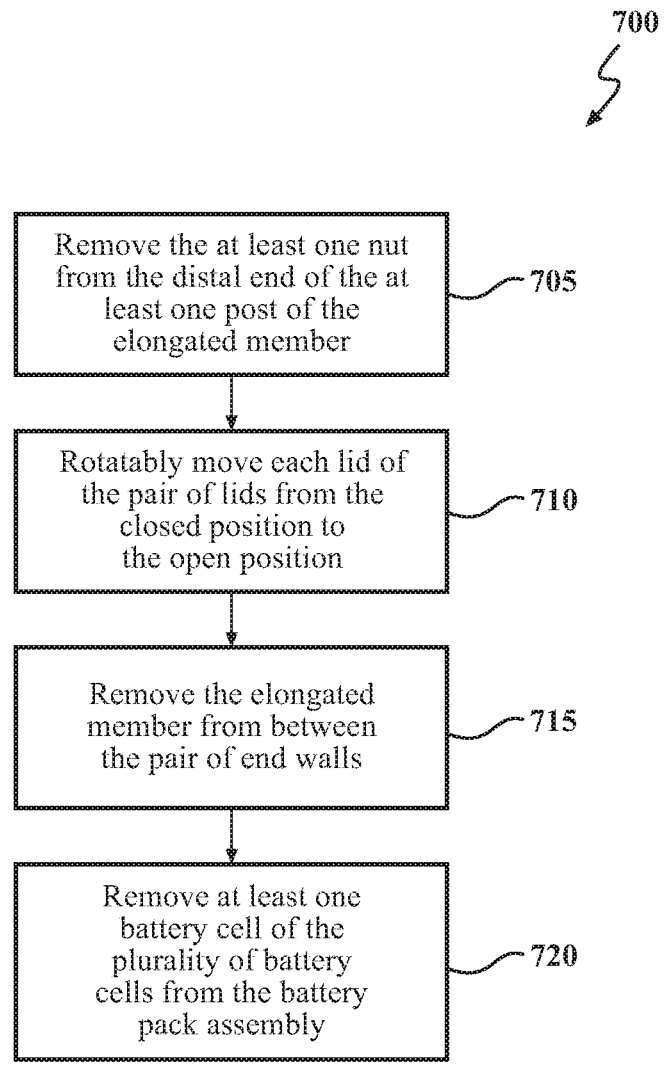
FIG. 7 depicts a flowchart of an illustrative method of removing a battery cell from a battery pack assembly of FIG. 1 according to one or more embodiments shown or described herein.

Now referring to FIG. 7, a flowchart of an illustrative method 700 of removing the battery cell 24a of the plurality of battery cells 24 from the battery pack assembly 20 of FIG. 1 is depicted. At block 705, the at least one nut 48 is removed from the distal end 46 of the at least one post 44 of the elongated member 40. At block 710, each of the pair of lids 34 is moved, or rotatably pivoted from the closed position to the open position. It should be appreciated that the movement from the closed position to the open position is in the direction of arrow A2. Likewise, movement of the pair of lids 34 from the open position to the closed position is in the direction of the arrow A1. At block 715, the elongated member 40 is removed from between the pair of end walls 26 of the housing 22. It should be understood that in some embodiments, block 715 may be omitted as the elongated member 40 does not need to be removed from the housing 22. At block 720, at least one battery cell 24a of the plurality of battery cells 24 is removed from the battery pack assembly 20. It should be understood that removal of the at least one battery cell 24*a* is not required, and, in some embodiments, at least one battery cell 24*a* may be added to the battery pack assembly 20.

The above described battery pack assembly provides for a housing that includes an elongated member and a pair of lids that retain each battery cell of a plurality of battery cells while electrically connecting each of a plurality of battery cells to a vehicle component. The pair of elongated lids each include a circuit board and a plurality of terminal connectors to electrically couple each battery cell of the plurality of battery cells. The housing is configured such that the plurality of battery cells are easily removed by rotatably moving each lid of the pair of lids from a closed position to an open position and removing the elongated member. Once the pair of lids are open and the elongated member is removed from the battery pack assembly, each battery cell of the plurality of battery cells may be removed from the battery pack assembly.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A battery pack assembly comprising:
   a housing comprising:
      a pair of sidewalls and a pair of end walls defining a cavity, and
      a pair of lids are directly and hingedly attached to each of an upper portion of each of the pair of sidewalls, each lid of the pair of lids having an interior surface, each lid of the pair of lids moves between an open position and a closed position;
      a plurality of terminal connectors positioned on each interior surface of each of the pair of lids;
   a plurality of battery cells positioned within the cavity, each battery cell of the plurality of battery cells having a pair of terminals,
   wherein when each lid of the pair of lids is in the closed position, each of the plurality of terminal connectors are respectively electrically coupled to a corresponding terminal of the pair of terminals of each battery cell of the plurality of battery cells.

2. The battery pack assembly of claim 1, wherein when each lid of the pair of lids are in the open position access to the cavity is permitted to remove at least one battery cell of the plurality of battery cells.

3. The battery pack assembly of claim 1, further comprising:
   a circuit board coupled to the interior surface of each of the pair of lids and communicatively coupled to the plurality of terminal connectors.

4. The battery pack assembly of claim 3, wherein the circuit board includes a conductive member, the conductive member is communicatively coupled to the plurality of terminal connectors.

5. The battery pack assembly of claim 4, wherein the conductive member is coupled to offsetting pairs of terminal connectors of the plurality of terminal connectors such that each battery cell of the plurality of battery cells are arranged in a series configuration.

6. The battery pack assembly of claim 4, wherein in the closed position each of the plurality of terminal connectors are engaged with the pair of terminals of each of the plurality of battery cells.

7. The battery pack assembly of claim 4, wherein in the open position each of the plurality of terminal connectors are disengaged with the pair of terminals of each of the plurality of battery cells.

8. The battery pack assembly of claim 3, further comprising:
   an elongated member extending between the pair of end walls, the elongated member having an upper surface,
   a portion of the interior surface of the pair of lids contacts the upper surface of the elongated member when the pair of lids are in the closed position.

9. The battery pack assembly of claim 8, wherein:
   at least one post extends upwardly from the upper surface of the elongated member, the at least one post configured to receive a fastener,
   the fastener is configured to retain the interior surface of the pair of lids against the upper surface of the elongated member such that the pair of lids are in a locked position.

10. A battery pack assembly comprising:
    a housing comprising:
       a pair of sidewalls, a pair of end walls, and a bottom wall that extends between the pair of sidewalls and the pair of ends walls defining a cavity;
       an elongated member extending between the pair of end walls;
       a pair of lids are directly and hingedly attached to each of an upper portion of each of the pair of sidewalls, each lid of the pair of lids having an interior surface, each lid of the pair of lids move between an open position and a closed position; and
       a circuit board coupled to the interior surface of each of the pair of lids;
       a plurality of terminal connectors positioned on and extending from each interior surface of each of the pair of lids and communicatively coupled to the respective circuit board such that when the lid is in the closed position, each of the plurality of terminal connectors extend into the cavity; and
    a plurality of battery cells positioned within the cavity, each battery cell of the plurality of battery cells having a pair of terminals,
    wherein in the closed position each of the plurality of terminal connectors are respectively electrically coupled to a corresponding terminal of the pair of terminals of the plurality of battery cells.

11. The battery pack assembly of claim 10, wherein:
    each battery cell of the plurality of battery cells has a pair of terminals,
    in the closed position each of the plurality of terminal connectors are electrically coupled to a corresponding terminal of the pair of terminals of each battery cell of the plurality of battery cells.

12. The battery pack assembly of claim 11, wherein the circuit board includes a conductive member, the conductive member is electrically coupled to the plurality of terminal connectors.

13. The battery pack assembly of claim 12, wherein the plurality of terminal connectors include a leg portion and a curvilinear portion, the leg portion is electrically coupled to the conductive member and the curvilinear portion engages with the corresponding terminal of plurality of terminals of the plurality of battery cells in the closed position.

14. The battery pack assembly of claim 13, wherein, wherein the conductive member is coupled to offsetting pairs of terminal connectors of the plurality of terminal connectors such that each battery cell of the plurality of battery cells are arranged in a series configuration.

15. The battery pack assembly of claim 10, wherein when each lid of the pair of lids are in the open position access to the cavity is permitted to remove at least one battery cell of the plurality of battery cells.

16. The battery pack assembly of claim 10, wherein in the closed position, a portion of the interior surface of the pair of lids contacts the elongated member.

17. The battery pack assembly of claim 16, wherein:
at least one post extends upwardly from an upper surface of the elongated member, the at least one post has a distal end configured to receive a fastener,
the fastener is configured to retain the pair of lids against the upper surface of the elongated member such that the pair of lids are in a locked position.

18. A method of removing at least one battery cell of a plurality of battery cells from a battery pack assembly, each battery cell of the plurality of battery cells having a pair of terminals, the method comprising:
removing a fastener from a post that extends between each of a pair of lids, the pair of lids are directly and hingedly attached to each of an upper portion of a pair of respective sidewalls of a housing that further includes a pair of end walls, the pair of sidewalls and the pair of end walls defining a cavity of the housing, each lid of the pair of lids having an interior surface that includes a plurality of terminal connectors positioned on each interior surface, and each lid of the pair of lids moves between an open position and a closed position;
pivoting the pair of lids from the closed position to the open position such that in the closed position, each of the plurality of terminal connectors are respectively electrically coupled to a corresponding terminal of the pair of terminals of each battery cell of the plurality of battery cells and in the open position, the each of the plurality of terminal connectors are free from the corresponding terminal of the pair of terminals of each battery cell; and
removing the at least one battery cell positioned within the cavity from the battery pack assembly.

19. The method of claim 18, wherein pivoting the pair of lids from the closed position to the open position disengages a plurality of terminal connectors positioned on each lid of the pair of lids from a plurality of terminals extending each battery cell in the battery pack assembly.

20. The method of claim 18, wherein pivoting the pair of lids from the open position to the closed position engages a plurality of terminal connectors positioned on each lid of the pair of lids with a plurality of terminals extending each battery cell in the battery pack assembly such that that each battery cell in the battery pack assembly is electrically coupled to plurality of terminal connectors positioned on each lid of the pair of lids.

* * * * *

UNITED STATES PATENT AND TRADEMARK OFFICE
CERTIFICATE OF CORRECTION

| | |
|---|---|
| PATENT NO. | : 11,588,198 B2 |
| APPLICATION NO. | : 16/775830 |
| DATED | : February 21, 2023 |
| INVENTOR(S) | : Geoffrey D. Gaither |

It is certified that error appears in the above-identified patent and that said Letters Patent is hereby corrected as shown below:

In the Specification

In Column 11, Line(s) 12, delete "positon" and insert --position--, therefor.

In the Claims

In Column 16, Line(s) 25, Claim 20, delete "that that" and insert --that--, therefor.

Signed and Sealed this
Twenty-eighth Day of November, 2023

Katherine Kelly Vidal
*Director of the United States Patent and Trademark Office*